(12) United States Patent
Carcangiu et al.

(10) Patent No.: US 7,677,242 B2
(45) Date of Patent: Mar. 16, 2010

(54) SOLAR-PANEL UNIT

(75) Inventors: Giacomo Carcangiu, Genoa (IT); Marcello Sardo, Cuneo (IT); Ignazio Carcangiu, Sadali (IT); Rocco Sardo, Cuneo (IT)

(73) Assignee: Lasen Development LLC, Wilmington, DE (US)

( * ) Notice: Subject to any disclaimer, the term of this patent is extended or adjusted under 35 U.S.C. 154(b) by 16 days.

(21) Appl. No.: 12/001,559

(22) Filed: Dec. 11, 2007

(65) Prior Publication Data

US 2009/0145423 A1 Jun. 11, 2009

(51) Int. Cl.
*F24J 2/00* (2006.01)
*F24J 2/06* (2006.01)
*F24J 2/12* (2006.01)

(52) U.S. Cl. .................. 126/600; 126/569; 126/572; 126/593; 126/601

(58) Field of Classification Search ................ 126/600, 126/572, 593, 601–608; *F24J 2/00, 2/06, F24J 2/14, 2/38, 2/52, 2/54, 3/02*
See application file for complete search history.

(56) References Cited

U.S. PATENT DOCUMENTS

| | | | | | |
|---|---|---|---|---|---|
| 342,030 | A | * | 5/1886 | Nelke | 359/598 |
| 820,127 | A | * | 5/1906 | Pope | 126/605 |
| 1,047,554 | A | * | 12/1912 | Nichols | 126/607 |
| 1,162,505 | A | * | 11/1915 | Nichols | 126/604 |
| 1,855,815 | A | * | 4/1932 | Abbot | 126/603 |
| 1,946,184 | A | * | 2/1934 | Abbot | 126/603 |
| 3,847,136 | A | * | 11/1974 | Salvail | 126/592 |
| 4,000,734 | A | * | 1/1977 | Matlock et al. | 126/576 |
| 4,129,119 | A | * | 12/1978 | Yoke | 126/607 |
| 4,144,931 | A | * | 3/1979 | Medico, Jr. | 165/48.2 |
| 4,203,426 | A | * | 5/1980 | Matlock et al. | 126/605 |
| 4,245,616 | A | * | 1/1981 | Wyland | 126/579 |
| 4,269,173 | A | * | 5/1981 | Krueger et al. | 126/634 |
| 4,316,448 | A | * | 2/1982 | Dodge | 126/600 |
| 4,365,617 | A | * | 12/1982 | Bugash et al. | 126/578 |
| 4,561,423 | A | * | 12/1985 | Blasey | 126/604 |
| 4,597,377 | A | * | 7/1986 | Melamed | 126/600 |
| 4,632,091 | A | * | 12/1986 | Wiens | 126/578 |
| 4,883,340 | A | * | 11/1989 | Dominguez | 359/593 |
| 5,172,483 | A | * | 12/1992 | Yocono et al. | 33/528 |
| 5,632,823 | A | * | 5/1997 | Sharan | 136/246 |
| 5,730,117 | A | * | 3/1998 | Berger | 126/604 |
| 6,443,145 | B1 | * | 9/2002 | Buron et al. | 126/601 |
| 6,498,290 | B1 | * | 12/2002 | Lawheed | 136/246 |

(Continued)

FOREIGN PATENT DOCUMENTS

CH 633878 A5 * 12/1982

(Continued)

*Primary Examiner*—Steven B McAllister
*Assistant Examiner*—Daniel E Namay
(74) *Attorney, Agent, or Firm*—Seed IP Law Group PLLC

(57) ABSTRACT

A solar-panel unit is provided with: an attachment structure; at least one solar panel, which is delimited by an extensive plane surface of incidence of the solar radiation and is connected to the attachment structure; and a hinging assembly, set between the attachment structure and the solar panel, to enable rotation of the solar panel with respect to the attachment structure about an inclined hinge axis forming an angle smaller than 90° with a horizontal plane.

11 Claims, 3 Drawing Sheets

U.S. PATENT DOCUMENTS

| | | | |
|---|---|---|---|
| 6,696,637 B2 * | 2/2004 | Lawheed | 136/246 |
| 6,793,187 B2 * | 9/2004 | McGee | 248/289.11 |
| 6,923,498 B1 * | 8/2005 | Mecham | 296/210 |
| 7,325,542 B2 * | 2/2008 | Mejia | 126/605 |
| 2002/0023638 A1 * | 2/2002 | Buron et al. | 126/601 |
| 2004/0112373 A1 * | 6/2004 | Djeu | 126/604 |
| 2004/0216734 A1 * | 11/2004 | Lawheed | 126/573 |
| 2004/0240974 A1 * | 12/2004 | Mohamed | 414/416.03 |
| 2005/0011513 A1 * | 1/2005 | Johnson | 126/698 |
| 2005/0279347 A1 * | 12/2005 | Mejia | 126/605 |
| 2006/0118104 A1 * | 6/2006 | Hon | 126/571 |
| 2006/0195983 A1 * | 9/2006 | Polevoy et al. | 5/288 |
| 2007/0227574 A1 * | 10/2007 | Cart | 136/206 |
| 2008/0163859 A1 * | 7/2008 | Dang | 126/42 |
| 2008/0257335 A1 * | 10/2008 | Lowstuter | 126/605 |
| 2008/0264474 A1 * | 10/2008 | Frauenknecht et al. | 136/251 |
| 2008/0302354 A1 * | 12/2008 | Jones et al. | 126/578 |
| 2009/0077910 A1 * | 3/2009 | Gordon | 52/213 |

FOREIGN PATENT DOCUMENTS

| | | | |
|---|---|---|---|
| DE | 19912007 A1 * | 9/2000 | |
| DE | 19916514 A1 * | 11/2000 | |
| GB | 2054826 A * | 2/1981 | |
| GB | 2269661 A * | 2/1994 | |
| JP | 63091457 A * | 4/1988 | |
| JP | 05322319 A * | 12/1993 | |

* cited by examiner

SOLAR-PANEL UNIT

The present invention relates to a photovoltaic-panel unit.

BACKGROUND OF THE INVENTION

In the field of use of solar energy, it is known to use solar-panel units, each of which comprises a supporting structure designed to be anchored to the ground, and a plate-type solar panel. In some applications, the plate-type solar panel is stably connected to the supporting structure, whilst in other cases the supporting structure is hinged to a fixed support for turning whit the panel about a vertical axis.

Albeit used, the known solar-panel units of the type described above prove to be not altogether satisfactory as regards efficiency, in so far as the presence of a single panel and the adjustment about a vertical axis do not enable optimal exposure to solar radiation to be obtained, above all owing to the fact that different areas of the panel at different times of the day are in partial or total shade, thus reducing the efficiency of the unit proportionally.

SUMMARY OF THE INVENTION

The aim of the present invention is to provide a solar-panel unit that will enable a simple solution at contained costs of the problems set forth above.

According to the present invention, a solar-panel unit is provided comprising a supporting structure and at least one solar panel delimited by an extensive plane surface of incidence of solar radiation and connected to said attachment structure, said solar-panel unit being rotatably mounted to enable rotation of said solar panel with respect to said supporting structure about an inclined rotation axis forming an angle smaller than 90° with a horizontal plane.

Preferably, in the unit defined above, said inclined rotation axis is substantially parallel to said surface of incidence of said solar radiation.

BRIEF DESCRIPTION OF THE DRAWINGS

The invention will now be described with reference to the annexed drawings, which illustrate a non-limiting example of embodiment thereof, and in which.

DETAILED DESCRIPTION OF THE INVENTION

Figure 1:
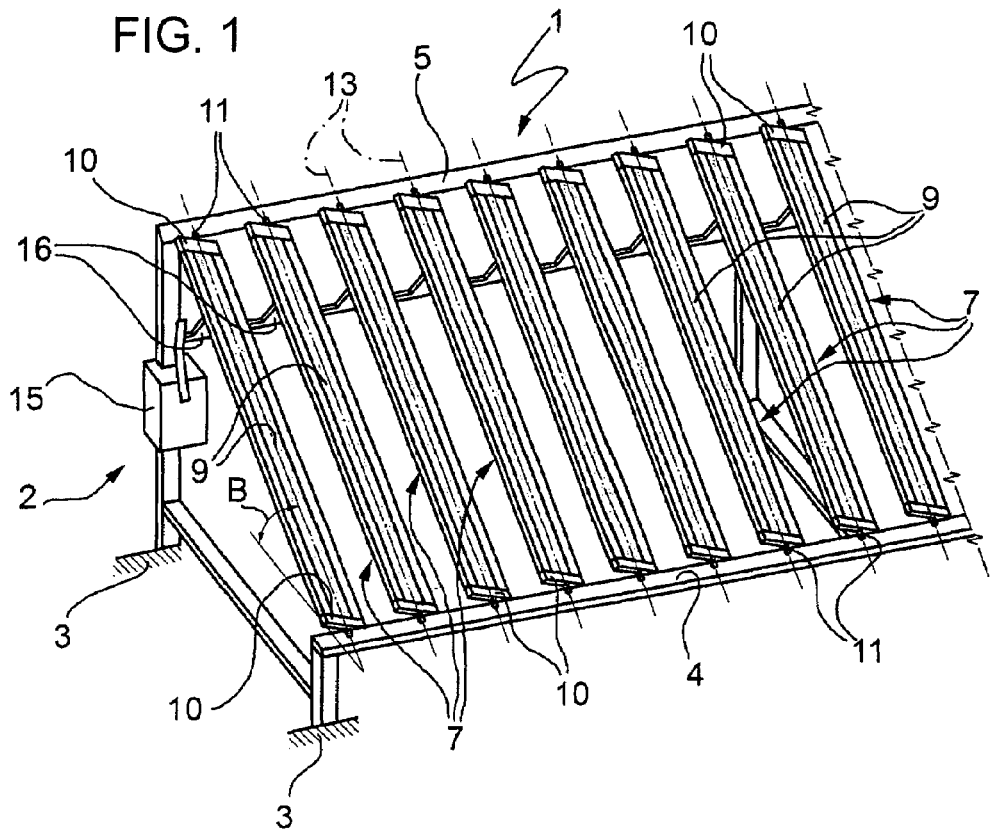
FIG. 1 is a partial perspective view of a first preferred embodiment of a solar-panel unit according to the present invention.

In FIG. 1, designated as a whole by 1, is a solar-panel unit comprising a supporting structure 2, which is designed to be fixed to a fixed support 3 and in turn comprises a bottom cross member 4 and a top cross member 5, which is set parallel and in raised position with respect to the bottom cross member 4 itself.

Once again with reference to FIG. 1, the unit 1 moreover comprises a plurality of inclined solar panels 7 extending in positions set alongside one another between the cross members 4 and 5 and orthogonal to the cross members 4 and 5 themselves. Each solar panel 7 conveniently has an elongated rectangular shape, is delimited by an extensive plane surface 9 of incidence of the solar radiation, and is, preferably but not necessarily, of a photovoltaic-cell type.

Each solar panel 7 comprises respective opposite end portions 10, hinged to the cross members 4 and 5 via respective hinge-pins 11 for rotating about a fixed inclined rotation axis 13 of its own extending within the solar panel 7 itself. The respective inclined rotation axes 13 of more than one solar panel 7 are parallel to one another and form with a horizontal plane an angle B smaller than 90°, conveniently ranging between 30° and 60° and, preferably, in the region of 45°. The solar panels 7 can rotate with respect to the supporting structure 2 about the respective inclined rotation axes 13 under the thrust of a single driving motor 15 of a lever transmission 16, coupled, in a way in itself known, to the mobile member of the motor 15, on one side, and to each solar panel 7, on the other. According to a variant (not illustrated), the motor 15 is replaced by a manual actuation lever.

In this way, following upon actuation of the motor 15 or by acting manually on the lever, the solar panels 7 are simultaneously rotated about the respective inclined rotation axes 13 and set in an optimal position for reception of the solar radiation.

Figure 3:
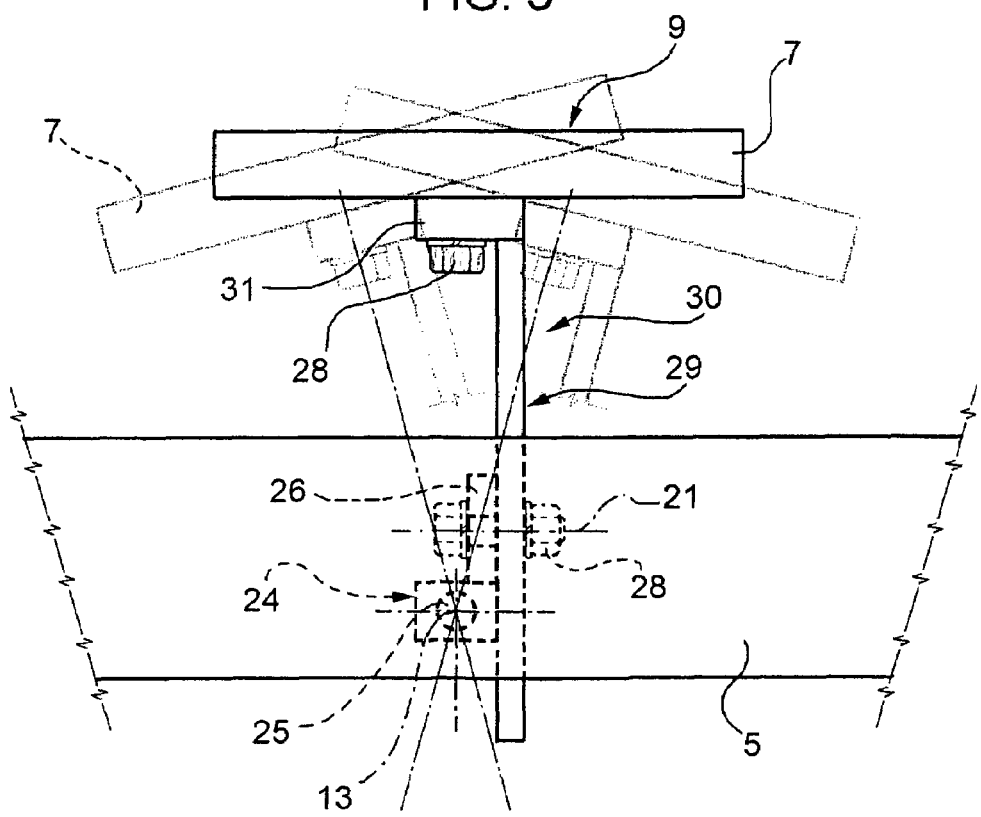
FIG. 3 illustrates a detail of FIG. 2 in different functional positions.
Figure 2:
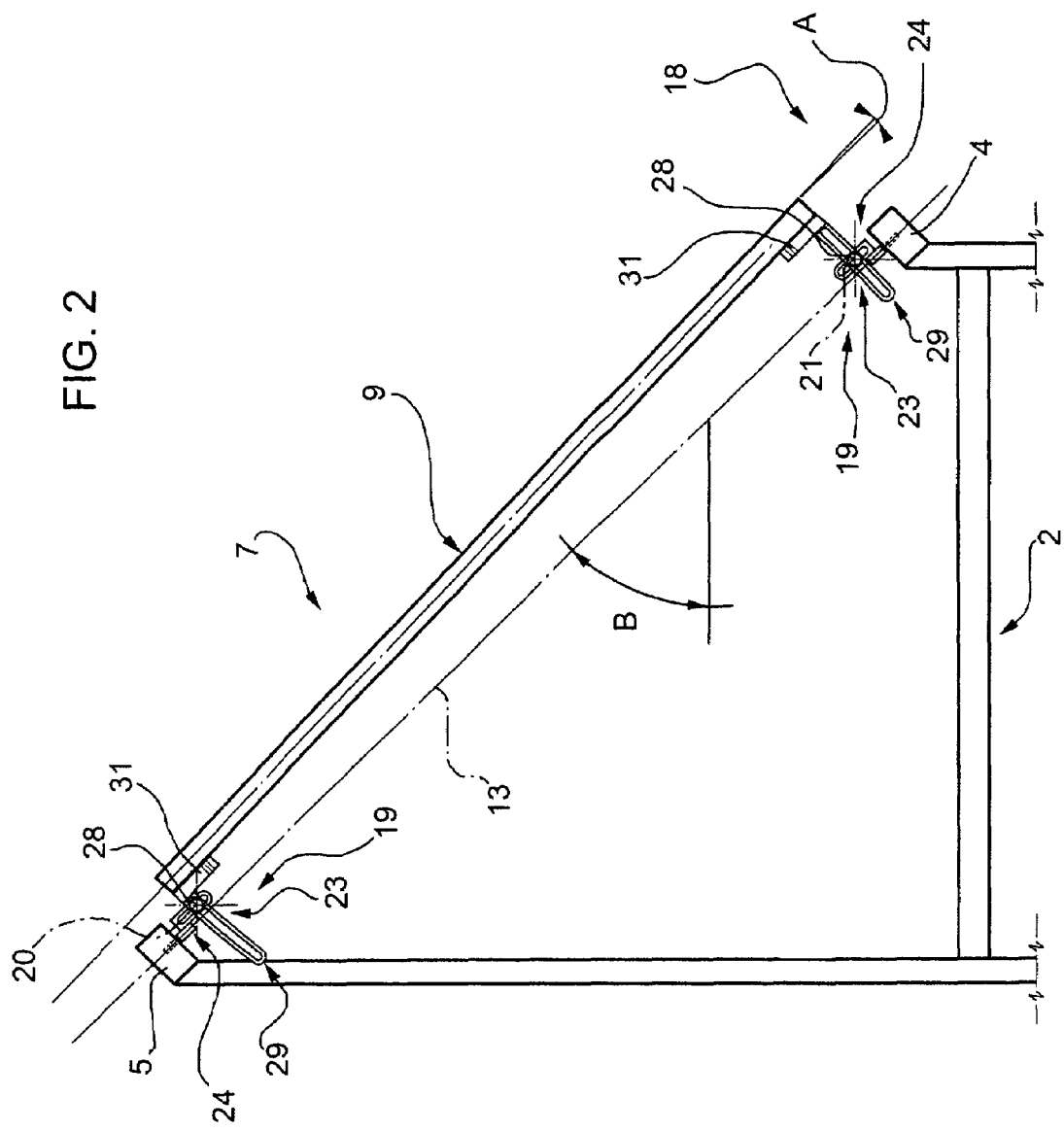
FIG. 2 illustrates, in side view, a second preferred embodiment of the solar-panel unit according to the present invention.
Figure 4:
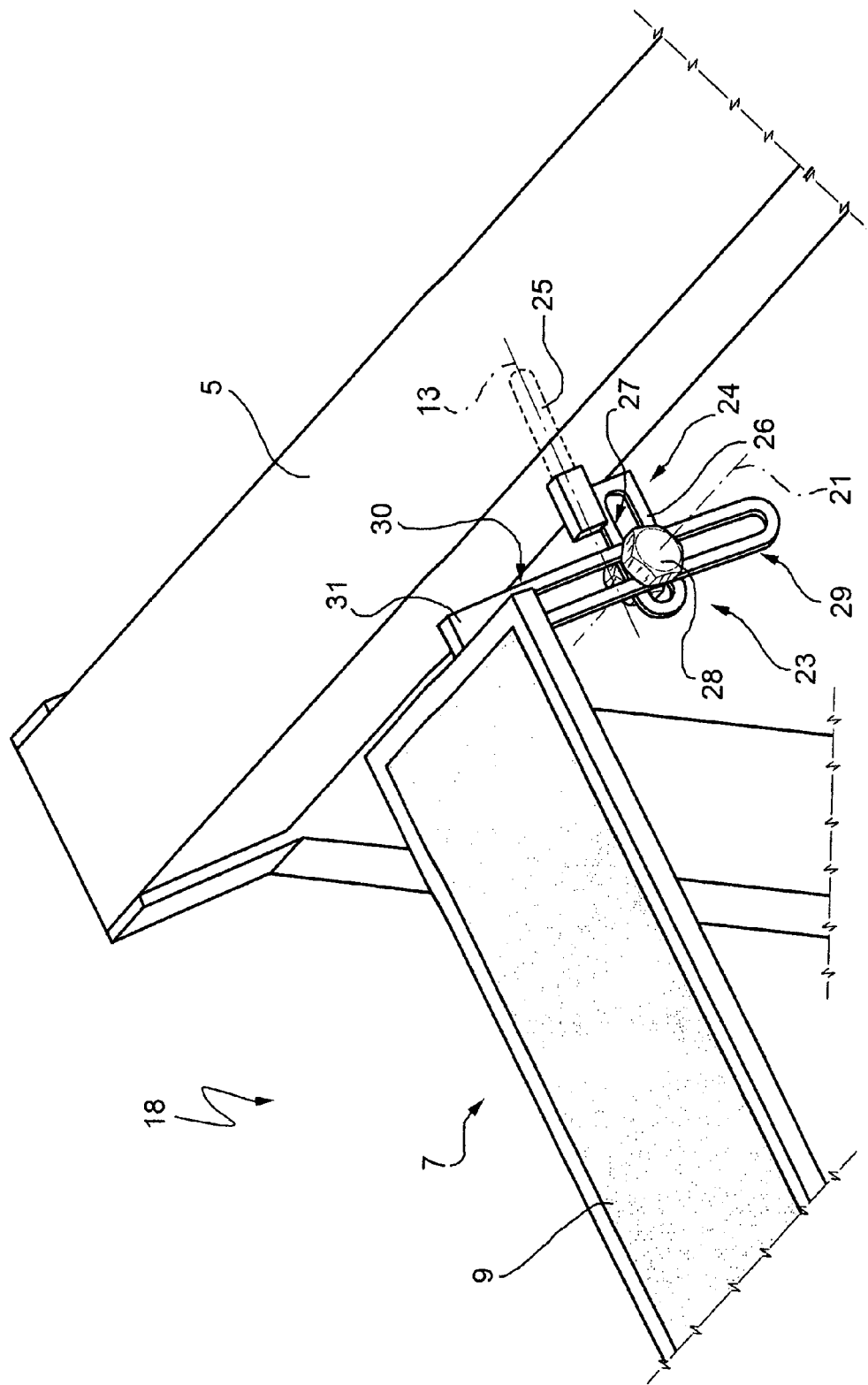
FIG. 4 is an enlarged perspective view of the detail of FIG. 3.

The embodiment illustrated in FIGS. 2 to 4 regards a solar-panel unit 18, which differs from the unit 1 for some details of implementation, and the constituent parts of which are distinguished, wherever possible, by the same reference numbers as the corresponding parts of the unit 1.

In the unit 18, each solar panel 7 is coupled to the cross members 4 and 5 via an adjustment assembly 19, designed to enable continuous adjustment of the position of the solar panel 7 and hence of its surface 9 of incidence of the solar radiation with respect to the supporting structure 2 about the fixed inclined rotation axis 13 and about two mobile rotation axes 20 and 21 orthogonal to the inclined rotation axis 13.

With specific reference to FIGS. 2, 3 and 4, the assembly 19 comprises, for each longitudinal end portion, an adjustment device 23, which is set in the proximity of a perimetral edge of the corresponding solar panel 7 and comprises a bracket 24 for attachment to the corresponding cross member 4, 5, which in turn comprises a hinge-pin 25, which extends coaxially the corresponding inclined rotation axis 13 and is rotatably inserted and axially fixed in position within a blind hole, which is also coaxial to the corresponding inclined rotation axis 13. In a direction parallel and opposite to the pin 25, the bracket 24 moreover comprises a slotted portion 26 (FIG. 4), the slot 27 of which extends parallel to the inclined rotation axis 13 in a position that is eccentric with respect to the inclined rotation axis 13 itself and is traversed by the stem of a fulcrum screw 28 extending coaxially to the corresponding rotation axes 20, 21. The stem of the fulcrum screw 28 also traverses the slot of a slotted portion 29 of a further bracket 30, which forms part of the corresponding device 23, and an attachment portion 31 of which is fixedly connected to the solar panel 7 on the opposite side to the surface 9 of incidence. The slotted portion 29 is curved with the concavity facing the slotted portion 29 of the corresponding opposite device 23.

The slotted portions 26 and 29 of each device 23 enable adjustment of the position of the surface 9 of incidence with respect to the supporting structure 2 and in particular continuous variation of the angle A (FIG. 2) of positioning formed between the surface 9 itself and the fixed inclined rotation axis 13. The variation of said angle A is subordinate to the length of the slotted portions 26, 29. In the particular embodiment, the angle of positioning A preferably ranges between 20° and 30°.

In use, the angle A is adjusted until it reaches a desired value, after which the screws are tightened, thus stably blocking the corresponding brackets 24 and 30 in corresponding fixed positions. At this point, via the motor 15 or the manual actuation lever, the solar panels 7 are rotated, each, about the corresponding inclined rotation axis 13 between two angular end-of-travel positions (indicated with a faint line in FIG. 3), set on opposite sides of a central reference position, illustrated with a heavy line once again in FIG. 3.

From the foregoing, it appears evident how the units 1 and 18 described, since they enable adjustment of the solar panels 7 about inclined axes that intersect or are set in a position close to the corresponding surfaces of incidence have, with respect to the known solutions, levels of efficiency that are considerably higher in so far as the adjustments envisaged enable optimization of the exposure of the panels to solar light.

From the foregoing, it appears evident that modifications and variations can be made to the units 1 and 18 described herein, without thereby departing from the scope of protection defined by the claims. In particular, the solar panels 7 can be coupled to the attachment structure via adjustment devices that are different from a constructional point of view from the ones indicated but are such as to enable the adjustments described.

The invention claimed is:

1. A solar-panel unit comprising:
   a support structure having a bottom cross bar and a top cross bar, the top cross bar being parallel to and in a raised position with respect to the bottom cross bar; and
   a plurality of solar panels including at least a first solar panel and a second solar panel, each solar panel delimited by a plane surface of incidence of solar radiation and having a first end rotatably coupled to the bottom cross bar and a second end rotatably mounted to the top cross bar to be rotatable about an inclined rotation axis forming a substantially constant angle smaller than 90° with a respect to a horizontal plane, each of the plurality of solar panels positioned alongside at least one other laterally adjacent solar panel and having the plane surface parallel to each other, all of the rotation axes for the solar panels in the plurality being on substantially the same plane; and a first adjustment device and a second adjustment device for each solar panel wherein each solar panel includes first and second ends, the first adjustment device rotatably coupling the first end to the support structure, the second adjustment device rotatably coupling the second end to the support structure, at least one of said first and second adjustment devices having slidably coupled members, providing adjustment within a distance range, at least one of the first and second ends coupled to the corresponding one of the first and second adjustment devices and selectively fixable to the adjustment device within the distance range to form an angle of positioning different from zero between the corresponding inclined rotation axis and the surface of incidence.

2. The solar-panel unit according to claim 1, wherein the respective inclined rotation axes are respectively substantially parallel to the corresponding plane surface of incidence.

3. The solar-panel unit according to claim 1, wherein a portion of the respective inclined extends rotation axes between opposing ends of the corresponding solar panels, about which the plurality of solar panels rotate, respectively, is within the corresponding solar panel.

4. The solar-panel unit according to claim 1, wherein the at least one end is slidably coupled to the corresponding one of the first and second adjustment devices along a first axis substantially parallel to the inclined rotation axis, and a second axis substantially perpendicular to the inclined rotation axis.

5. The solar-panel unit according to claim 1, wherein each solar panel includes first and second ends, and separate first and second hinge pins, the first hinge pin rotatably coupling the first end to the support structure and the second hinge pin rotatably coupling the second end to the coupling structure, the inclined rotation axis extending from the first hinge pin to the second hinge pin.

6. The solar-panel unit according to claim 5, wherein a portion of the inclined rotation axis between the first and second ends of the corresponding solar panel about which the solar panel rotates, is within the solar panel.

7. The solar-panel unit according to claim 1, further comprising:
   an actuator configured to rotate all of the solar panels simultaneously about the corresponding inclined rotation axes.

8. The solar-panel unit according to claim 4, wherein the at least one end is further rotatably coupled to the corresponding one of the first and second adjustment devices along a rotation axis substantially orthogonal to the inclined rotation axis.

9. A solar-panel unit comprising:
   a support structure including a first cross member and a second cross member spaced from the first cross member;
   a plurality of solar panels including at least a first solar panel and a second solar panel, each including a surface of incidence of solar radiation, a first end, and a second end, each solar panel laterally positioned adjacent at least one other solar panel, and rotatably mounted to a first axle at its first end at the first cross member and at its second end to a second axle at the second cross member;
   a transmission lever coupled to each of the solar panels;
   a rotation assembly coupled to the transmission lever to cause each of the solar panels in the plurality to rotate about an inclined rotation axis that forms an acute angle with a horizontal plane; a first adjustment device and a second adjustment device for each solar panel wherein each solar panel includes first and second ends, the first adjustment device rotatably coupling the first end to the support structure, the second adjustment device rotatably coupling the second end to the support structure, at least one of said first and second adjustment devices having slidably coupled members, providing adjustment within a distance range, at least one of the first and second ends coupled to the corresponding one of the first and second adjustment devices and selectively fixable to the adjustment device within the distance range to form an angle of positioning different from zero between the corresponding inclined rotation axis and the surface of incidence.

10. The solar-panel unit according to claim 9 wherein the respective second ends are rotatably mounted to rotate about a second axis orthogonal to the inclined rotation axis.

11. The solar-panel unit according to claim 9, further comprising:
    an actuator configured to impart rotational motion to each solar panel from at least one of the first and second ends thereof, about the inclined rotation axis.

* * * * *

UNITED STATES PATENT AND TRADEMARK OFFICE
CERTIFICATE OF CORRECTION

PATENT NO. : 7,677,242 B2  Page 1 of 1
APPLICATION NO. : 12/001559
DATED : March 16, 2010
INVENTOR(S) : Giacomo Carcangiu et al.

It is certified that error appears in the above-identified patent and that said Letters Patent is hereby corrected as shown below:

Title Page Item (75)
"Giacomo Carcangiu, Genoa (IT)" should read -- Giacomo Carcangiu, Genova (IT) --.

Column 3
Line 62, "portion of the respective inclined extends rotation axes" should read -- portion of the respective inclined rotation axes --.

Signed and Sealed this

Ninth Day of November, 2010

David J. Kappos
*Director of the United States Patent and Trademark Office*